US006245994B1

(12) United States Patent
McKenzie

(10) Patent No.: US 6,245,994 B1
(45) Date of Patent: Jun. 12, 2001

(54) HIGH IMPACT-RESISTANT FUSE BOX

(76) Inventor: Fredrick Daniel McKenzie, 1365 Van Antwerp Rd. - Apt J104, Niskayuna, NY (US) 12309

( * ) Notice: Subject to any disclaimer, the term of this patent is extended or adjusted under 35 U.S.C. 154(b) by 0 days.

(21) Appl. No.: 09/239,097

(22) Filed: Jan. 28, 1999

(51) Int. Cl.[7] ................................ H02G 3/08; H02B 1/04

(52) U.S. Cl. ......................... 174/52.1; 361/642; 361/646; 361/837

(58) Field of Search .................................... 361/642, 646, 361/837; 174/52.1, 52.3; 439/621, 622

(56) References Cited

U.S. PATENT DOCUMENTS

| | | | | |
|---|---|---|---|---|
| 3,579,045 | * | 5/1971 | Keogh et al. | 317/114 |
| 3,673,310 | * | 6/1972 | Welsh | 174/58 |
| 3,724,706 | | 4/1973 | Slocum | 220/3.8 |
| 3,740,498 | * | 6/1973 | Herbert | 191/49 |
| 3,852,514 | | 12/1974 | Lauben | 174/58 |
| 4,004,199 | * | 1/1977 | Pearce et al. | 317/230 |
| 4,212,250 | * | 7/1980 | Burgess | 105/50 |
| 4,454,565 | * | 6/1984 | Krasij et al. | 361/376 |
| 4,688,146 | * | 8/1987 | Newmark et al. | 361/364 |
| 4,695,691 | * | 9/1987 | Leth-Olson et al. | 200/303 |
| 4,834,828 | * | 5/1989 | Murphy | 156/359 |
| 5,059,746 | | 10/1991 | Hayes et al. | 174/52.1 |
| 5,081,560 | | 1/1992 | Donnerstag | 361/358 |
| 5,272,279 | * | 12/1993 | Filshie | 174/50 |
| 5,281,758 | | 1/1994 | Miller | 174/52.1 |
| 5,400,211 | * | 3/1995 | Evans | 361/502 |
| 5,673,774 | * | 10/1997 | Trapp et al. | 191/49 |
| 5,837,933 | * | 11/1998 | Fligelman | 174/50 |

FOREIGN PATENT DOCUMENTS 2 536 348 * 5/1984 (FR) .

* cited by examiner

*Primary Examiner*—Dean A. Reichard
*Assistant Examiner*—Carmelo Oliva
(74) *Attorney, Agent, or Firm*—Schmeiser, Olsen & Watts

(57) ABSTRACT

An apparatus, such as a fuse box structure, containing circuitry capable of receiving and processing a current having a power of at least 0.1 megawatts, and associated method of fabrication, for use with a vehicle such as a railed vehicle, or with a static structure such as a building. The fuse box enclosure is made of a material having high impact resistance such that the fuse box enclosure is able to reliably remain intact when the fuse blows. The fuse box material is a plastic that has a hardness of at least D-50, or at least A-95, on the Shore scale. A preferred fuse box material is an ether-type urethane with a hardness of about D-75 on the Shore scale.

45 Claims, 3 Drawing Sheets

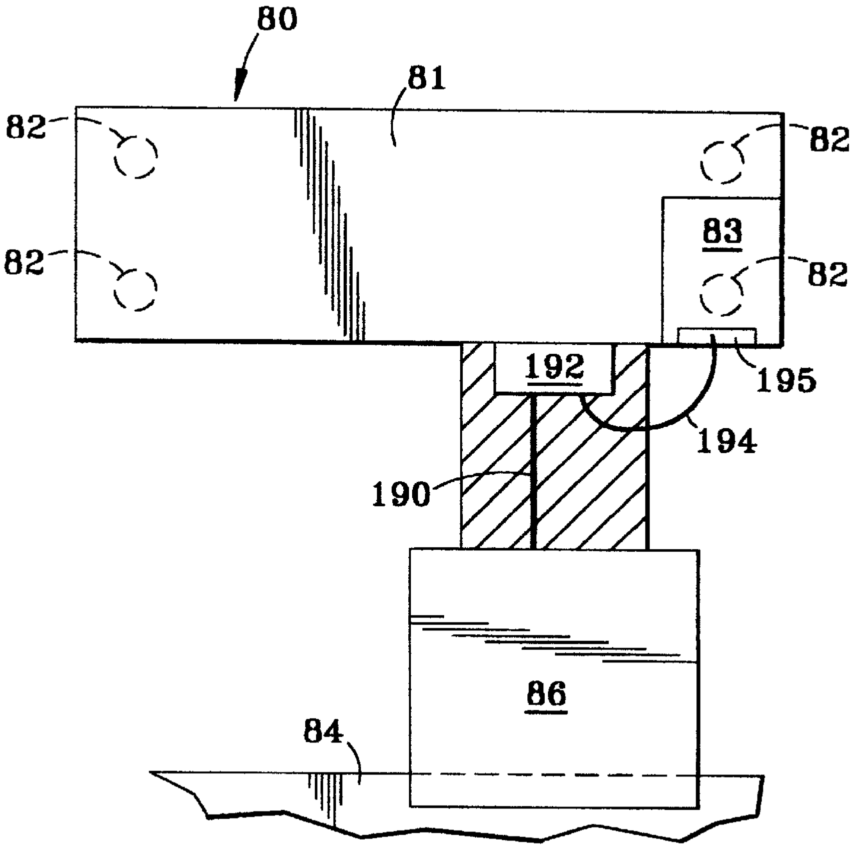
FIG. 3
FIG. 4
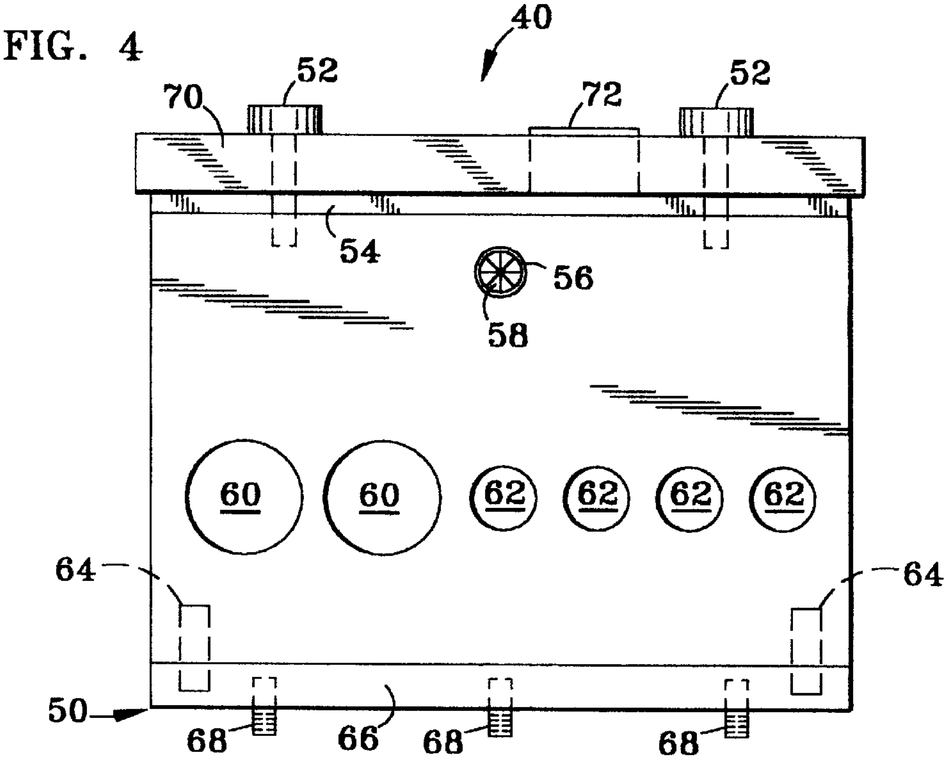

HIGH IMPACT-RESISTANT FUSE BOX

BACKGROUND OF THE INVENTION

1. Technical Field

The present invention relates to a fuse box containing high-power fuse circuitry such that the fuse box enclosure remains intact when the fuse blows. In particular, the present invention relates to a high impact-resistant fuse box.

2. Related Art

Railed vehicles, such as trains, travel along railed tracks and receive electrical power from a third rail that parallels the tracks. The electrical power is ordinarily of the order of a megawatt with currents typically at 1000 amperes and voltages typically at 600 volts. In order to protect the train from an electrical overload, a fuse box is typically mounted on an exterior wall of the locomotive with an input cable electrically coupled to the third rail and an output cable electrically coupled to the engine. The fuse box contains a fuse circuit designed to blow a fuse at a predetermined input current. The fuse is typically 8 inches long and 3 inches in diameter and contains a gas. When the fuse blows, the gas explodes at high temperature and high energy, causing fragments of the fuse material to strike the walls of the fuse box enclosure with great force. Current fuse boxes made of a fiberglass material are not reliably able to withstand the force of such an explosion, resulting in damages that are expensive to repair.

Thus, there is a need for a high impact-resistant fuse box coupled to a railed vehicle, wherein the fuse box is able to remain intact when the fuse blows. Additionally, a need exists for a high impact-resistant fuse box for use with other vehicles and also for static structures.

SUMMARY OF THE INVENTION

Generally, the present invention overcomes the difficulties of the prior art by providing an apparatus structure that comprises a box and an attachment device. The box includes a material having a hardness of at least D-50 on a Shore scale or a material having a hardness of at least A-95 on the Shore scale. The attachment device is within the box and coupled to the box, and is for the purpose of attaching a circuit pattern to the box. The circuit pattern includes a capacity to process an input electric current having a power of at least 0.1 megawatts.

More specifically, the present invention provides an apparatus that comprises a box and an attachment device. The box includes a base and a cover. The base and the cover are each made of an ether-type urethane material having a hardness of at least D-50 on a Shore scale. The cover is coupled to the base. The base includes: at least one first hole through a wall of the base and at least one second hole through the wall of the base. The attachment device is within the box and coupled to the box, and is for the purpose of attaching a circuit pattern to the box. The circuit pattern includes a capacity to process an input electric current having a power of at least 0.1 megawatts, wherein the circuit pattern includes a fuse that blows if the input electric current exceeds a predetermined input current.

Generally, the present invention overcomes the difficulties of the prior art by providing a method for forming an apparatus, comprising the steps of:

selecting a material having a hardness of at least D-50 on a Shore scale or at least A-95 on the Shore scale; and forming a box made of the material, wherein forming the box includes forming an attachment device within the box for coupling a circuit pattern to the box, and wherein the circuit pattern includes a capacity to process an input electric current having a power of at least 0.1 megawatts.

More specifically, the present invention provides a method for forming an apparatus, comprising the steps of:

selecting an ether-type urethane material having a hardness of at least D-50 on a Shore scale or at least A-95 on the Shore scale; and forming a box, including forming a base and a cover, wherein the base and the cover are each made of the material, and wherein forming the base includes:

- forming an attachment device within the base for coupling a circuit pattern to the base, wherein the circuit pattern includes a capacity to process an input electric current having a power of at least 0.1 megawatts, and wherein the circuit pattern includes a fuse that blows if the input electric current exceeds a predetermined input current;
- forming at least one first hole through a wall of the base; and
- forming at least one second hole through the wall of the base.

The present invention has the advantage of providing a high impact-resistant box, such as a fuse box, for use with a circuit pattern within the box that is capable of receiving and processing an electrical input current at a power of at least 0.1 megawatts. The box is made of a material having a high impact resistance such that the box enclosure is able to reliably remain intact if impacted by energetic objects, such as products of an explosion from the blowing of a fuse located within the box. The box material is a plastic that has a hardness of at least D-50 on the Shore scale or A-95 on the Shore scale. For D-material and A-material having comparable hardness (e.g., D-50 and A-95), the D-material is preferred because the D-material has a greater tensile strength, tear strength, and elastic restoration capability.

The present invention uses an ether-type urethane material having a hardness of of at least D-50 on the Shore scale. Urethane is relatively inexpensive to use for fabricating the box, because its property of being liquid at room temperature enables it to be used with an open-pour molding process, in contrast with a more expensive process, such as injection molding, that would be used with most other plastics. The material has an especially high impact resistance for the purpose of the present invention, because of an associated high tensile strength, high tear strength, and the ability to be restored to its original length upon release of a force that causes the material to be elongated. The ether-type character of the urethane enables the material to maintain its beneficial properties in the presence of moisture. Moreover, the material is not brittle and offers the added benefit of being able to absorb vibration.

The box of the present invention may be advantageously coupled to a vehicle, such as a railed vehicle, or to a static structure, such as a telephone pole or building.

BRIEF DESCRIPTION OF THE DRAWINGS

FIG. 3 illustrates a top view of a box mounted to a railed vehicle, in accordance with a preferred embodiment of the present invention.

FIG. 4 depicts a side view of a box, in accordance with a preferred embodiment of the present invention.

DETAILED DESCRIPTION OF THE INVENTION

Figure 1:
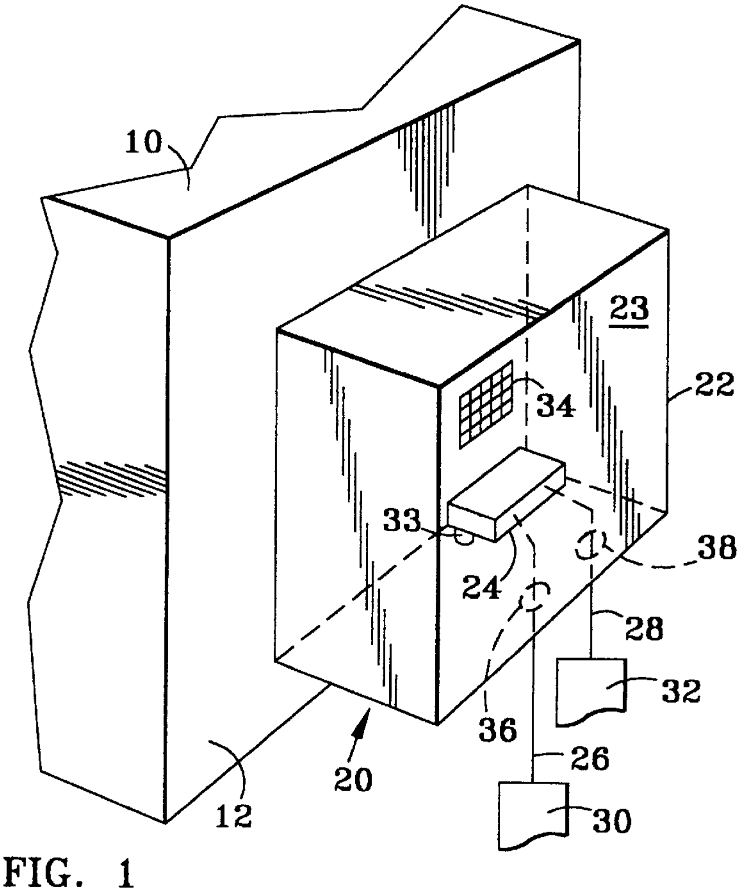
FIG. 1 depicts a top perspective view of a fuse box structure coupled to a mechanical structure, in accordance with a preferred embodiment of the present invention.

FIG. 1 illustrates a top perspective view of a fuse box structure 20 coupled to an exterior surface 12 of a mechanical structure 10, wherein the attachment is accomplished by attachment pattern 34. The mechanical structure 10 may be any vehicle, such as a railed vehicle or a truck. Alternatively, the mechanical structure 10 may be any static structure, such as a telephone pole or a building. The mechanical structure 10 may have any geometrical shape.

The fuse box structure 20 comprises a box 22. The box 22 is composed of a material that has a high enough impact resistance to enable the box 22 to withstand an explosion within the box, wherein the explosion causes particles within the box 22 to impact the enclosure of the box 22 with great force (see e.g. wall 23, which is a portion of the enclosure of the box 22). The preferred embodiment utilizes an ether-type urethane material that has a hardness of about D-75 on the Shore scale. Note that a D-75 urethane material has a tensile strength of at least 10,000 psi, a tear strength of about 800 pounds, and the ability to be elastically elongated by up to 50% of its length. An alternative urethane material of about A-95 on the Shore scale that could be used for the present invention has a tensile strength of about 6,000 psi, a tear strength of 200 to 250 pounds, and the ability to be elastically elongated by up to 350% of its length. An ether type urethane is preferred over an ester-type urethane, because the ether-type urethane is moisture resistant whereas the ester-type urethane cannot tolerate even small amounts of moisture.

Generally, the material used for the box 22 of the present invention may comprise a material, such as urethane, that has a hardness of at least D-50 on the Shore scale or at least A-95 on the Shore scale. Such material having a hardness of at least D-50 offers good resistance to brittle fracture, is very rigid, and has good vibration absorption capability, all as a consequence of the hardness, tensile strength, tear strength, and elastic restoration that characterizes materials having a hardness of at least D-50. Additionally, material having a hardness of at least D-50 resists further tearing after having experienced an initial tear. Alternatively, a material having a hardness of at least A-95 on the Shore scale may be used for the purpose of the present invention. For D-material and A-material having comparable hardness (e.g., D-50 and A-95), the D-material is preferred because the D-material has a markedly greater tensile strength, tear strength, and elastic restoration capability. Moreover, the A-material is much more flexible than the D-material, such that the D-material has a significantly greater ability to maintain its grip around an object embedded within the material, such as a threaded metal insert or a fastener head, so as to prevent the object from being dislodged during the course of an explosion within the box 22.

The fuse box structure 20 comprises a box 22, a circuit pattern 24, input cable 26, and output cable 28. The circuit pattern 24 is within the interior of the box 22 and is coupled to the box 22. Any practical means of affixation, such as one or more threaded bolts or studs, may be used. The circuit pattern 24 may be any circuit pattern that receives and processes an electrical power of at least 0.1 megawatts. An example of the many varieties of combinations of input current and associated voltage corresponding to 0.1 megawatts is 200 amperes and 500 volts, respectively. Input current to railed vehicles from a third rail typically have currents such as 1000 amperes with associated voltages such as 600 volts, under normal operating conditions, corresponding to an input power of about 0.6 megawatts. The ability of the circuit pattern 24 within the impact-resistant box 22 to receive and process an input electrical power of at least 0.1 megawatt distinguishes the present invention from shock-resistant and vibration resistant enclosures that house semiconductor electronic devices that operate at relatively low power. For example, U.S. Pat. No. 5,059,746 (Hayes et al., Oct. 22, 1991), which is hereby incorporated by reference, discloses a sealed housing for containing electrical components, such as Hall effect sensors, wherein the sealed housing is intended to be mounted on the door of an automobile, and wherein such electronic sensing devices are known in the art to operate at power in the milliwatt range.

Figure 6:
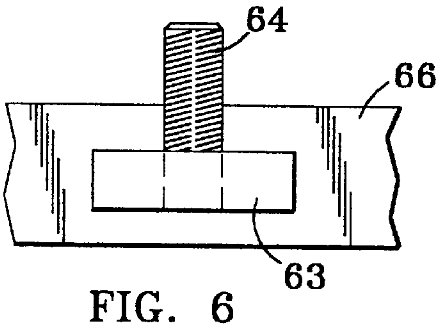
FIG. 6 depicts a portion of a base wall of the box in FIG. 4 with a threaded stud in a threaded metal insert within the base wall.
Figure 7:
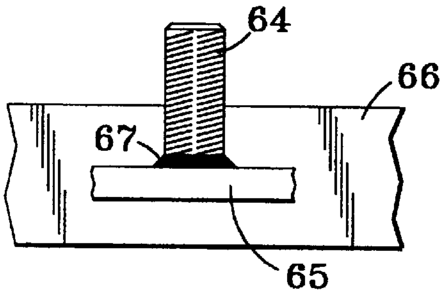
FIG. 7 depicts a portion of a base wall of the box in FIG. 4 with a threaded stud welded to a metal plate within the base wall.

The circuit pattern 24 is attached to the box 22 by an attachment device 33, which may be any suitable attachment device such as one or more threaded studs. FIGS. 4, 6, and 7 show an analogous attachment device in the form of one or more threaded studs 64 for attaching a circuit pattern to the box 40 of FIG. 4, to be described infra.

An example of the circuit pattern 24 in FIG. 1 of the present invention is a fuse circuit pattern comprising a fuse that blows when the input current exceeds a predetermined value. Under normal operating conditions, a circuit pattern 24 that comprises a fuse delivers an output current to an external circuit. When the fuse blows, an open circuit is created within the circuit pattern 24 such that the circuit pattern 24 cannot deliver the output current to the external circuit. A fuse blow may also be accompanied by an explosion that causes particles of the fuse enclosure to impact the box 22 enclosure with great force so as to jeopardize the integrity of the box 22.

Figure 2:
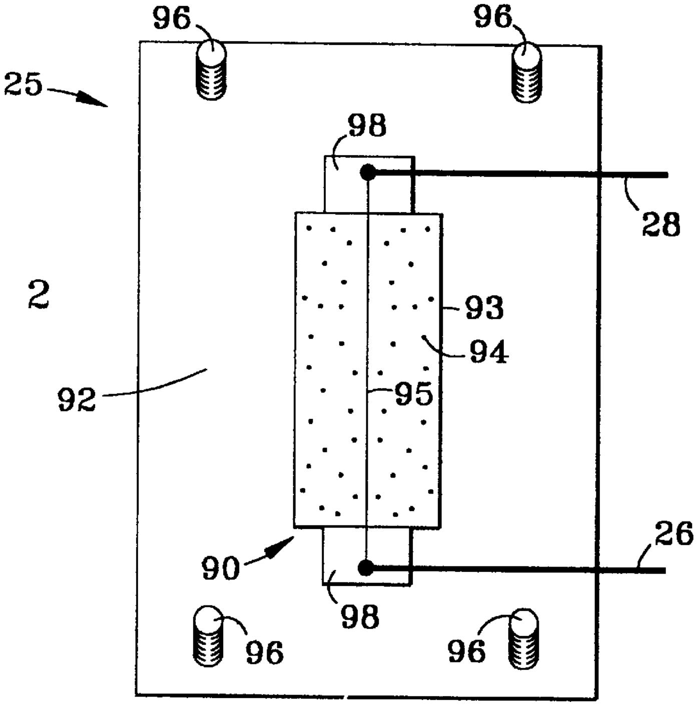
FIG. 2 depicts a top view of a fuse circuit pattern representation of the circuit pattern of FIG. 1.

FIG. 2 depicts a fuse circuit pattern 25 that illustrates the circuit pattern 24 of FIG. 1. The fuse circuit pattern 25 comprises a fuse 90 and a plate 92 on which the fuse 90 is mounted. The plate 92 is coupled to the box 22 of FIG. 1 by any practical attachment, such as the threaded studs 96 (analogous to the threaded studs 64 of FIG. 4). The fuse 90 includes a fuse enclosure 93, a gas 94 within the enclosure 93, a fuse wire 95 within the enclosure 93, and a fuse end 98 which facilitates coupling of the fuse wire 95 to the input cable 26 and the output cable 28. When the input current delivered to the fuse 90 by the input cable 26 exceeds a predetermined value, the fuse blows; i.e., the fuse wire 95 opens, which creates an open circuit. The fuse blow may be accompanied by an explosion that causes the gas 94 to flow outward with great energy through the fuse enclosure 93, as discussed previously. The particular fuse configuration shown in FIG. 2 is illustrative. Any fuse that results in an open circuit when the fuse blows is within the scope of the present invention.

The circuit pattern 24 of FIG. 1 is electrically coupled to input cable 26 and output cable 28. Input cable 26 is one or more electrical cables capable of transmitting an input electric current from an input circuit pattern 30 to the circuit pattern 24, wherein the input circuit pattern 30 is located outside of the box 22. Output cable 28 is one or more electrical cables capable of transmitting an output electric current from the circuit pattern 24 to an output circuit pattern 32, wherein the output circuit pattern 32 is located outside of the box 22. The input circuit pattern 30 is any circuit pattern that can deliver a current that circuit pattern 24 is capable of receiving and processing.

FIG. 3 illustrates a top view of a box 192, such as a fuse box, coupled to a railed vehicle 80. The railed vehicle 80, which comprises a body 81, a mechanism (e.g., a plurality of wheels 82) mechanically coupled to the body 81 wherein the mechanism's operation causes the body 81 to move, and an engine 83, is powered by a third rail 84. Electrical power in the form of an input electric current is transported from the third rail 84 to an electrically conductive pickup shoe 86 which maintains continuous contact with the third rail 84 as the railed vehicle 80 moves. Although FIG. 3 depicts pickup shoe 86 as being on top of the third rail 84, the pickup shoe 86 may have any spatial relationship to the third rail 84 that enables the pickup shoe 86 to maintain continuous contact with the third rail 84. The input electrical current is transmitted from the pickup shoe 86 to the input cable 190 and then into the box 192. An output electrical current from the box 192 is conducted by an output cable 194 to an output circuit pattern 195 associated with the engine 83.

In FIG. 1, the input cable 26 is routed through a first hole 36 in the box 22. The first hole 36 is not necessarily one hole, but represents one or more holes for routing the one or more cables of input cable 26 from the input circuit pattern 30 to the circuit pattern 24. The one or more holes of the first hole 36 may be located within any wall or walls of the box 22.

The output circuit pattern 32 in FIG. 1 is any circuit pattern that the circuit pattern 24 is capable of delivering. The output cable 28 is routed through a second hole 38 in the box 22. The second hole 38 is not necessarily one hole, but represents one or more holes for routing the one or more cables of output cable 28 from the circuit pattern 24 to the output circuit pattern 32. The second hole 38 may be located within any wall or walls of the box 22. The one or more holes of the second hole 38 may comprise some or all of the one or more holes of the first hole 36. The one or more holes of the first hole 36 may comprise some or all of the one or more holes of the second hole 38.

The attachment pattern 34 for attaching the box 22 to the mechanical structure 10 may be any mechanism capable of providing a secure attachment. For example, the attachment pattern 34 could comprise at least one threaded stud, wherein one end of the threaded stud is fastened within a wall of either the box 22 or the mechanical structure 10. If one end of the threaded stud is fastened within the wall material of the box 22, the other end of the threaded stud could be passed through a hole in a wall of the mechanical structure 10, enabling the secure attachment to be accomplished by applying a washer and nut to the other end of the threaded stud.

The box 22 may have any geometrical shape. The box 22 may comprise a single surface that encloses the internal space within the box 22 or may comprise any number of surfaces or parts that are joined together. The box 22 may be formed by any method known to one skilled in the art, such as the method described infra following the discussion relating to FIG. 9.

Figure 5:
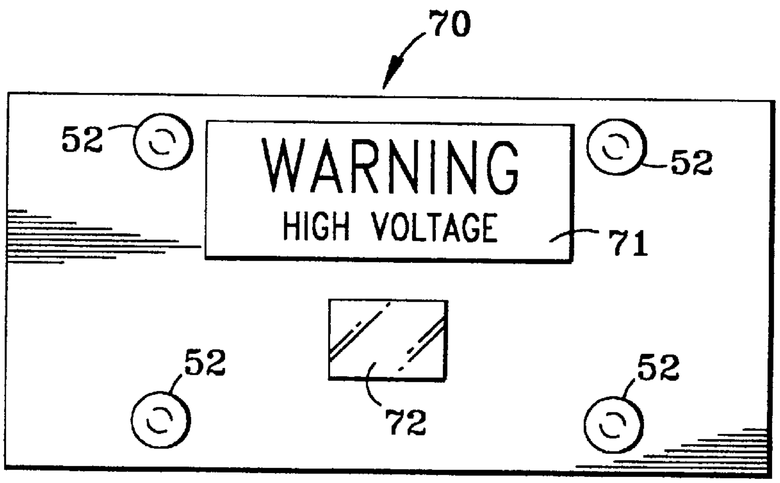
FIG. 5 depicts a top view of the cover of the box in FIG. 4.

FIG. 4 illustrates a side view of a preferred box 40, comprising a base 50 and a cover 70, wherein the cover 70 is coupled to the base 50 by any affixation mechanism such as one or more bolts 52 (e.g., 6 bolts). The electrical apparatus (circuit pattern, input cable, output cable, input circuit pattern, output circuit pattern) are not shown in FIG. 4. The cover 70 optionally comprises a transparent viewing area 72 through which an observer outside the box 40 could view a portion of the circuit pattern within the box 40, such as a fuse within the circuit pattern. The cover 70 may also display a written warning relating to high voltage, such as the high voltage warning 71 shown in FIG. 5 which depicts a top view of the cover 70.

The box 40 in FIG. 4 optionally includes a gasket 54 whose sealing properties create a moisture barrier between the interior space within the box 40 and the space external to the box 40. Alternatively, a sealing gasket may be fabricated within the cover 70. An optional threaded vent hole 56 within the base 50 and a threaded vent plug 58 within the vent hole 56 comprises a moisture barrier between the internal space within the box 40 and the space external to the box 40. This configuration provides a protective mechanism such that the vent plug 58 is ejected from the vent hole 56 into the space external to the box 40 when the internal pressure within the box 40 exceeds a predetermined maximum allowable internal pressure.

In FIG. 4, at least one first hole 60 serves to route input cable between the input circuit pattern outside the box 40 and the circuit pattern within the box 40. At least one second hole 62 serves to route output cable between the circuit pattern within the box 40 and the output circuit pattern outside the box 40. The circuit pattern is to be attached to the base 50 by any suitable attachment device such as one or more threaded studs 64 (e.g., 4 threaded studs), wherein one end of the threaded stud 64 is embedded within the base wall 66 and the other end of the threaded stud 64 couples with the circuit pattern. FIG. 6 illustrates an alternative approach in which the threaded stud 64 is screwed into a threaded insert 63, wherein the threaded insert 63 comprises a suitable material such as a metal, and wherein the threaded insert 63 is embedded within the fabric of the material of the base wall 66. FIG. 7 illustrates another alternative approach in which the threaded stud 64 is welded to a metal plate 65 at weld joint 67, wherein the metal plate 65 is embedded within the fabric of the material of the base wall 66.

Figure 8:
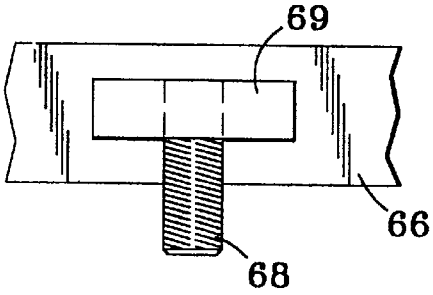
FIG. 8 depicts a portion of a base wall of the box in FIG. 4 with a second threaded stud in a second threaded metal insert within the base wall.
Figure 9:
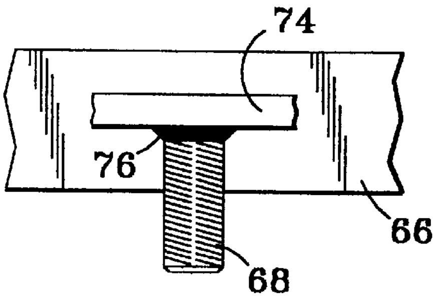
FIG. 9 depicts a portion of a base wall of the box in FIG. 4 with a second threaded stud welded to a second metal plate within the base wall.

The base 50 in FIG. 4 could be attached to a railed vehicle by any suitable method of attachment, such as by utilizing one or more second threaded studs 68 (e.g. 6 second threaded studs 68), wherein one end of the second threaded stud 68 is embedded within the base wall 66 and the other end of the second threaded stud 68 couples with the railed vehicle. FIG. 8 illustrates an alternative approach in which the second threaded stud 68 is screwed into a second threaded insert 69, wherein the second threaded insert 69 comprises a suitable material such as a metal, and wherein the second threaded insert 69 is embedded within the fabric of the material of the base wall 66. FIG. 9 illustrates another alternative approach in which the second threaded stud 68 is welded to a second metal plate 74 at a second weld joint 76, wherein the second metal plate 74 is embedded within the fabric of the material of the base wall 66.

The base 50 and cover 70 of FIG. 4 may be formed by any suitable method known to one skilled in the art, such as:

creating a mold for forming the cover 70 and creating a mold for forming the base 50 with plugs associated with first hole 60 and second hole 62, and if opted for, plugs associated with vent hole 56, threaded stud 64, and second threaded stud 68;

heating the mold in an oven to about 200±15° F.;

heating the box material, such as ether-type urethane, to about 180±5° F. (before, after, or concurrent with heating the mold);

adding hardener, that had been preheated to about 250–280° F., to the box material (e.g., add the hardener 4,4':methelyn-bis-2-chloroaniline in a material:hardener ratio of 4:1 by weight);

pouring the box material into both molds while the molds are still at about 200±15° F., within about 20 seconds after having added the hardener to the box material;

placing both molds (separately or together) in an oven having a temperature of about 200±15° F.;

removing the molds from the oven after about 1 hour;

removing the base and the cover from the molds;

placing the base and the cover (separately or together) in an oven having a temperature of about 200±15° F.;

removing the base and the cover from the oven after about 3 hours;

trimming away excess box material after the fuse box has cooled to about room temperature; and optionally placing a warning message on the outside surface of the cover.

While preferred and particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. Apparatus, comprising:

a box including a material selected from the group consisting of an ether-type urethane material having a hardness of at least D-50 on a Shore scale and an ether-type urethane material having a hardness of at least A-95 on the Shore scale; and an attachment device, within the box and coupled to the box, for attaching a circuit pattern to the box, wherein the circuit pattern includes a capacity to process an input electric current having a power of at least 0.1 megawatts.

2. The apparatus of claim 1, wherein the material has a hardness of D-75 on the Shore scale.

3. The apparatus of claim 1, wherein the box is coupled to an exterior surface of a static structure.

4. The apparatus of claim 1, wherein the box is coupled to an exterior surface of a vehicle.

5. The apparatus of claim 4, wherein the vehicle is a railed vehicle.

6. The apparatus of claim 1, further comprising the circuit pattern attached to the box by use of the attachment device, wherein the input electric current comprises at least 200 amperes and is at a voltage of at least 500 volts.

7. The apparatus of claim 1, further comprising the circuit pattern attached to the box by use of the attachment device, wherein the circuit pattern comprises a fuse that blows if the input electric current exceeds a predetermined input current.

8. The apparatus of claim 7, wherein the box comprises a viewing area through which an observer outside of the box may view the fuse.

9. The apparatus of claim 1, further comprising:

the circuit pattern attached to the box by use of the attachment device;

an input cable, electrically coupled to the circuit pattern, wherein the input cable includes a capacity to transmit the input electric current from an input circuit pattern located outside of the box to the circuit pattern; and an output cable, electrically coupled to the circuit pattern, wherein the output cable includes a capacity to transmit an output electric current from the circuit pattern to an output circuit pattern located outside of the box.

10. The apparatus of claim 9, further comprising at least one hole through a wall of the box, wherein the input cable passes through a first hole of the at least one hole, and wherein the output cable passes through a hole selected from the group consisting of the first hole and a second hole of the at least one hole.

11. The apparatus of claim 9, wherein the box is coupled to an exterior surface of a railed vehicle, and wherein a third rail comprises the input circuit pattern.

12. The apparatus of claim 1, further comprising a threaded stud, wherein a first end of the threaded stud is coupled to the box within a wall of the box, and wherein a second end of the threaded stud is outside of the box and is coupled to an exterior surface of a mechanical structure selected from the group consisting of a vehicle and a static structure.

13. The apparatus of claim 12, further comprising a threaded metal insert embedded within the wall, wherein the first end of the threaded stud is screwed into the threaded metal insert.

14. The apparatus of claim 12, further comprising a metal plate embedded within the wall, wherein the first end of the threaded stud is welded to the metal plate.

15. The apparatus of claim 1, further comprising at least one vent hole through a wall of the box, wherein a vent plug within the at least one vent hole includes a moisture barrier between an external space outside of the box and an internal space within the box, and wherein the vent plug is ejected from the at least one vent hole into the external space when an internal pressure within the internal space exceeds a predetermined internal pressure.

16. The apparatus of claim 15, wherein the at least one vent hole is threaded, and wherein the vent plug is threaded, and wherein the vent plug is screwed into the at least one vent hole.

17. The apparatus of claim 1, wherein the box comprises:

a base comprising the material; and a cover comprising the material, wherein the cover is coupled to the base, and wherein the circuit pattern is coupled to the base.

18. The apparatus of claim 17, wherein the cover comprises a sealing mechanism that serves as a moisture barrier between an external space outside of the box and an internal space within the box.

19. The apparatus of claim 17, wherein the box further comprises a gasket that is positioned between the base and the cover, wherein the gasket creates a moisture barrier between an external space outside of the box and an internal space within the box.

20. The apparatus of claim 1, wherein the attachment device comprises a threaded stud, wherein a first end of the threaded stud is coupled to the box within a wall of the box, and wherein a second end of the threaded stud is attachable to the circuit pattern.

21. The apparatus of claim 20, further comprising a threaded metal insert embedded within the wall, wherein the first end of the threaded stud is screwed into the threaded metal insert.

22. The apparatus of claim 20, further comprising a metal plate embedded within the wall, wherein the first end of the threaded stud is welded to the metal plate.

23. The apparatus of claim 1, wherein an exterior surface of the box displays an indicational warning relating to high voltage.

24. Apparatus, comprising:

a box including a base and a cover, wherein the base and the cover are each made of an ether-type urethane material having a hardness of at least D-50 on a Shore scale, wherein the cover is coupled to the base, and wherein the base includes:

at least one first hole through a wall of the base; and at least one second hole through the wall of the base; and an attachment device, within the box and coupled to the base, for attaching a circuit pattern to the base, wherein the circuit pattern includes a capacity to process an input electric current having a power of at least 0.1 megawatts, and wherein the circuit pattern includes a fuse that blows if the input electric current exceeds a predetermined input current.

25. The apparatus of claim 24, wherein the hardness is D-75 on the Shore scale.

26. The apparatus of claim 25, further comprising the circuit pattern attached to the box by use of the attachment device, wherein the input electric current comprises at least 200 amperes and is at a voltage of at least 500 volts.

27. The apparatus of claim 26, wherein the cover comprises a viewing area through which an observer outside of the box may view the fuse.

28. The apparatus of claim 26, wherein the box further comprises a gasket that is positioned between the base and the cover, and wherein the gasket creates a moisture barrier between an external space outside of the box and an internal space within the box.

29. The apparatus of claim 28, wherein the base further comprises a threaded vent hole through the wall of the base, wherein a threaded vent plug screwed into the vent hole includes a moisture barrier between the external space and the internal space, and wherein the vent plug is ejected from the vent hole into the external space when an internal pressure within the internal space exceeds a predetermined internal pressure.

30. The apparatus of claim 29, wherein the attachment device comprises a plurality of threaded studs, wherein a first end of the threaded stud is coupled to the base within a second wall of the base, and wherein a second end of the threaded stud is attachable to the circuit pattern.

31. The apparatus of claim 30, further comprising a threaded metal insert embedded within the second wall, wherein the first end of the threaded stud is screwed into the threaded metal insert.

32. The apparatus of claim 30, further comprising a metal plate embedded within the second wall, wherein the first end of the threaded stud is welded to the metal plate.

33. The apparatus of claim 30, wherein the circuit pattern is attached to the box, and further comprising:

an input cable, electrically coupled to the circuit pattern, wherein the input cable passes through the at least one first hole, and wherein the input cable includes a capacity to transmit the input electric current from an input circuit pattern located outside of the box to the circuit pattern; and an output cable, electrically coupled to the circuit pattern, wherein the output cable passes through the at least one second hole, and wherein the output cable includes a capacity to transmit an output electric current from the circuit pattern to an output circuit pattern located outside of the box.

34. The apparatus of claim 33, further comprising a plurality of second threaded studs, wherein a first end of the second threaded stud is coupled to the base within the second wall of the base, wherein a second end of the second threaded stud is outside of the box, wherein the second end of the second threaded stud is coupled to an exterior surface of a railed vehicle, and wherein a third rail comprises the input circuit pattern.

35. The apparatus of claim 34, further comprising a second threaded metal insert embedded within the second wall, wherein the first end of the second threaded stud is screwed into the second threaded metal insert.

36. The apparatus of claim 34, further comprising a second metal plate embedded within the second wall, wherein the first end of the second threaded stud is welded to the second metal plate.

37. The apparatus of claim 34, wherein the plurality of threaded studs comprises 6 threaded studs, wherein the plurality of second threaded studs comprises 4 second threaded studs, wherein the at least one first hole comprises 2 holes of a first size, wherein the at least one second hole comprises 4 holes of a second size, wherein an area of the first size exceeds an area of the second size, and wherein an exterior surface of the cover displays an indicational warning relating to high voltage.

38. A method for forming an apparatus, comprising the steps of:

selecting a material from the group consisting of an ether-type urethane material having a hardness of at least D-50 on a Shore scale and an ether-type urethane material having a hardness of at least A-95 on the Shore scale; and forming a box made of the material, wherein forming the box includes forming an attachment device within the box for coupling a circuit pattern to the box, and wherein the circuit pattern includes a capacity to process an input electric current having a power of at least 0.1 megawatts.

39. The method of claim 38, further comprising:

coupling the circuit pattern to the box by using the attachment device; and electrically coupling an input cable and an output cable to the circuit pattern, wherein the input cable includes a capacity to transmit an input electric current from an input circuit pattern located outside of the box to the circuit pattern, and wherein the output cable includes a capacity to transmit an output electric current from the circuit pattern to an output circuit pattern located outside of the box.

40. The method of claim 38, wherein the material has a hardness of D-75 on the Shore scale.

41. The method of claim 38, further comprising after the step of forming the box, coupling a base of the box to an exterior surface of a mechanical structure selected from the group consisting of a vehicle and a static structure.

42. A method for forming an apparatus, comprising the steps of:

selecting a material from the group consisting of an ether-type urethane material having a hardness of at least D-50 on a Shore scale and an ether-type urethane material having a hardness of at least A-95 on the Shore scale; and forming a box, including forming a base and a cover, wherein the base and the cover are each made of the material, wherein forming the base includes:

forming an attachment device within the base for coupling a circuit pattern to the base, wherein the circuit pattern includes a capacity to process an input electric current having a power of at least 0.1 megawatts, and wherein the circuit pattern includes a fuse that blows if the input electric current exceeds a predetermined input current;

forming at least one first hole through a wall of the base; and forming at least one second hole through the wall of the base.

43. The method of claim 42, wherein the hardness is D-75 on the Shore scale.

44. The method of claim 43, further comprising coupling the base to an exterior surface of a railed vehicle.

45. The method of claim 44, further comprising coupling the circuit pattern to the base by using the attachment device;

electrically coupling both an input cable and an output cable to the circuit pattern, wherein the input cable passes through the at least one first hole, wherein the input cable includes a capacity to transmit the input electric current from an input circuit pattern located outside of the box to the circuit pattern, wherein the output cable passes through the at least one second hole, and wherein the output cable includes a capacity to transmit an output electric current from the circuit pattern to an output circuit pattern located outside of the box; and coupling the cover to the base.

* * * * *